(12) United States Patent
Zackrisson et al.

(10) Patent No.: US 12,233,499 B2
(45) Date of Patent: Feb. 25, 2025

(54) DAMPER

(71) Applicant: GKN Aerospace Sweden AB, Trollhättan (SE)

(72) Inventors: Christer Zackrisson, Trollhättan (SE); James Gladh, Trollhättan (SE); Martin Lundstedt, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 505 days.

(21) Appl. No.: 17/624,942

(22) PCT Filed: Jul. 9, 2020

(86) PCT No.: PCT/EP2020/069425
§ 371 (c)(1),
(2) Date: Jan. 5, 2022

(87) PCT Pub. No.: WO2021/005172
PCT Pub. Date: Jan. 14, 2021

(65) Prior Publication Data
US 2022/0288732 A1    Sep. 15, 2022

(30) Foreign Application Priority Data

Jul. 11, 2019 (GB) .................................. 1909945

(51) Int. Cl.
*B23Q 1/70* (2006.01)
*B23Q 11/00* (2006.01)
(Continued)

(52) U.S. Cl.
CPC ............ *B23Q 1/70* (2013.01); *B23Q 11/0035* (2013.01); *F16F 7/108* (2013.01); *F16F 15/08* (2013.01);
(Continued)

(58) Field of Classification Search
CPC .. B23Q 1/70; B23Q 11/0032; B23Q 11/0035; B23Q 5/52; F16F 7/108; F16F 15/08;
(Continued)

(56) References Cited

U.S. PATENT DOCUMENTS 3,643,546 A * 2/1972 Richter .............. B23Q 17/0976
279/158
5,518,347 A * 5/1996 Cobb, Jr. ................ F16F 15/02
73/11.04
(Continued)

FOREIGN PATENT DOCUMENTS

CN      117651620 A    3/2024
DE   102007025934 A1   12/2008
(Continued)

OTHER PUBLICATIONS

WO document No. 2020/050765 to Fu published on Mar. 12, 2020.*
(Continued)

*Primary Examiner* — Pamela Rodriguez
(74) *Attorney, Agent, or Firm* — Sheppard Mullin Richter & Hampton LLP

(57) ABSTRACT

A milling machine includes a spindle which is arranged to receive a tool holder and in use to cause rotation of the tool holder within the spindle. A portion of the spindle housing surrounding the tool holder is provided with at least one pair of opposing damping units.

10 Claims, 10 Drawing Sheets

(51) Int. Cl.
   *F16F 7/108* (2006.01)
   *F16F 15/08* (2006.01)
(52) U.S. Cl.
   CPC ...... *B23C 2250/16* (2013.01); *B60G 2202/25* (2013.01); *F16F 2224/025* (2013.01); *F16F 2230/0052* (2013.01)
(58) Field of Classification Search
   CPC ........ F16F 2224/025; F16F 2230/0052; B23C 9/00; B23C 2250/16; B23C 1/02; B60G 2202/25
   See application file for complete search history.

(56) References Cited

U.S. PATENT DOCUMENTS

| | | |
|---|---|---|
| 2009/0155010 A1 | 6/2009 | Cook |
| 2010/0178123 A1* | 7/2010 | Ladra .................. F16F 15/005 409/141 |
| 2016/0207154 A1 | 7/2016 | Nebuka |

FOREIGN PATENT DOCUMENTS

| | | |
|---|---|---|
| DE | 20 2010 008 061 U1 | 10/2010 |
| DE | 102016210233 A1 | 12/2017 |
| EP | 1001184 A2 | 5/2000 |
| EP | 2600027 A2 | 6/2013 |
| EP | 2676765 A1 | 12/2013 |
| EP | 3210718 A2 | 8/2017 |
| JP | S62 68275 A | 3/1987 |
| WO | 2015082361 A1 | 6/2015 |

OTHER PUBLICATIONS

International Search Report and Written Opinion for PCT/EP2020/069425 mailed Oct. 22, 2020 (10 pages).

China National Intellectual Property Administration Notification of the Second Office Action for Application No. CN202080050159.8 mailed Jul. 23, 2024 (10 pages; with English translation).

* cited by examiner

DAMPER

CROSS-REFERENCE TO RELATED APPLICATIONS

This application is a national stage of, and claims priority to, Patent Cooperation Treaty Application No. PCT/EP2020/069425, filed on Jul. 9, 2020, which application claims priority to Great Britain Application No. GB 1909945.6, filed on Jul. 11, 2019, which applications are hereby incorporated herein by reference in their entireties.

BACKGROUND

Super-alloy materials are metal alloys which are extremely hard and durable and which can withstand high temperatures and stresses. They are used in many applications, including the aerospace industry, where such materials are often required for high performance components. These components also often have small geometrical tolerances, and so careful machining is required using specially hardened cutting tools and materials.

Complex geometries can be created using multi-axis machining centers, such as a 5-axis machining center of the type manufactured by GROB-WERKE GmbH & Co. KG.

Multi-axis machining centers are typically computer numerically controlled (CNC) machining centers which allow highly accurate control of a cutting head at the high speeds needed to economically and accurately form components from super alloy materials. Cutting speed can typically be in the region of 12,000 revolutions per minute of the cutting tool.

SUMMARY

The present disclosure is related to a machining apparatus, for example a multi-axis machining center, that is capable of machining super-alloy materials with improved accuracy, reliability, and cutting performance. The disclosure includes a multi-axis machining center with a damper, a damper unit for a milling machine or multi-axis machining center, and a method of damping a milling machine.

In an implementation, a multi-axis milling machine includes a spindle, the spindle arranged to receive a tool holder and in use to cause rotation of the tool holder within the spindle, wherein a portion of the spindle housing surrounding the tool holder is provided with one or more damping units (i.e., dampers).

Thus, providing a multi-tuned mass damper in such a configuration advantageously allows the vibrations that otherwise propagate through the machine and tool holder to be controlled. Each machine tool (for example a CNC multi-axis milling machine) has its own harmonic or natural frequencies which are a result of the design and build of the machine and the operating (cutting) conditions. During a cutting operation, the natural harmonic frequencies can cause the machine to vibrate above predetermined alarm thresholds.

Each machine exhibits its own harmonic 'weakness' in a certain direction or axis, i.e., a specific direction. Because of the build of each machine, the exact axis of harmonic 'weakness' varies. The term 'weakness' is intended to refer to an axis and position at which the natural harmonics of the machine are most prevalent, i.e., where a machine begins to vibrate excessively.

Conventionally, unwanted vibrations are addressed by providing the cutting tool holder and machine with sufficient mass and rigidity to prevent unwanted vibrations and harmonics developing.

Typically, when cutting super-alloys at high cutting speeds with ceramic tools, vibrations can develop in the cutting head and/or machine. These vibrations can exceed safe limits for the machine and or cutting tip. Machine manufacturers therefore incorporate vibration alarms that are activated at predetermined levels to stop a machine. This thereby prevents machine and/or tool damage. The machine can then be reset and restarted.

This safety system in conventional machinery advantageously prevents machine or tool damage, but dramatically reduces productivity as the number of alarm activations can increase.

The teachings on accordance with the present disclosure dramatically reduce unwanted alarm activations by identifying the 'weak' harmonic points on the machine and controlling and attenuating the vibration at or close to the point where the vibrations are most severe.

The cutting speeds used with ceramics cutting tips can be extremely high. For example, the cutting speeds may exceed 12,000 revolutions per minute. Natural harmonics of the machine can thereby very quickly reach an alarm threshold causing a machine to stop operating. In overnight machining, where operators set a machine to operate overnight, an alarm early in the machining time can result in very low productivity due to excessive machine stoppages.

In an arrangement described herein, the one or more damping units (dampers) may be coupled to the spindle housing at a position corresponding to the location of a resonant frequency of the housing at a predetermined spindle operating speed.

For a given cutting speed (which will be known for the part being machined and the materials involved), a position corresponding to the point at which the machine will vibrate resonantly at or close to that frequency can be determined. A damping arrangement as described herein can then be located at or close to that position. Furthermore, the damper can be arranged in line or parallel with the direction of the predicted resonant vibration. The resonance that would ordinarily occur for the cutting speed can then be attenuated.

The damping unit(s) may include an outer housing enclosing a damping mass, the damping mass being movable within and with respect to the housing. Housing a damping mass within the housing and allowing the mass to move allows for the damping to take place. The latency of movement of the mass with respect to the housing causes the damping to take place.

The housing and damping mass may be in the form of a concentric cylinder and a surrounding (also cylindrical) housing. The concentric axis of the cylinder and housing may be arranged to be parallel with the axis along which the spindle housing vibrates at resonance. Thus, the damper is arranged to attenuate the resonant vibration of the machine in the most effective way.

Other cross-sections of damper mass and housing may also be used. For example, the housing and mass could be elliptical allowing for greater mass with a smaller vertical height. Equally a square or rectangular arrangement may be used. However, a cylindrical arrangement allows for convenient manufacture, and also allow for a more accurate way to align the mass with respect to the housing such that the damper itself is dynamically stable.

The damping mass may be spaced from the surrounding housing by one or more elastic/elastomeric coupling(s). The couplings should allow relative movement of the damping mass with respect to the housing to allow the damping to take place.

The elastic coupling may be in the form of a plurality of elastomeric or rubber elements. These may be arranged uniformly around the damping mass so as to be in contact with the damping mass on one side and in contact with the housing on the other. Conveniently, the elements may be in the form of O-ring seals positioned proximate to the perimeter of the damping mass. This allows for convenient installation and alignment of the member. For example, the member may be arranged in a groove with the housing and/or the damping mass.

Depending on the vibrational performance of the machine, a single damping unit may be all that is needed to attenuate the resonant frequency of the machine at the cutting frequency/cutting speed and load. Alternatively, one or more pairs of damping units may be arranged around the machine, for example on the spindle housing of a milling machine. This advantageously allows the damping mass to be distributed to allow for convenient coupling of the dampers to the body of the machine and to avoid any issues with the damper body reducing the envelope of movement of the cutting head with respect to the workpiece.

The dampers may be conveniently positioned circumferentially and, optionally, equally spaced around the spindle housing of the machine.

The elastomeric or rubber elements may be continuous, for example O-ring seals. Portions of the inner surface of the end faces of the damper or portions of the end faces of the damping mass may optionally be provided with recesses in alignment with the normal line of contact of the elastomeric elements and the end faces. The term end faces is intended to refer to the ends of the damper in line with the axis of vibration that the damper it working to attenuate. In a cylindrical arrangement, this would be on the end faces of the cylinder.

By providing recesses which are arranged to be in line with or overlap the normal line of contact of the O-ring seal, the O-ring is effectively de-coupled from compression contact with the housing and damper mass at that particular point or over the length of overlap of the recess. Relative movement of the damping mass with respect to the housing will not then compress the elastomer at these points. This reduces the overall contact area the elastomer has with the damper mass and housing. For a given input force, the contact area is less and the pressure on the remaining elastomer material in contact between the two surfaces is increased.

In an implementation, the increase in pressure causes the damper to perform (i.e., to initiate damping) at a lower input force than if full contact of the elastomer is provided. The increased pressure initiates damping much more quickly, resulting in damping at lower input forces, for example, those associated with low levels of cutting force for a finishing machining.

In an implementation, the recesses and O-ring arrangement are located on either end of the damping unit, i.e., on an end of the damping unit facing the machine and on an opposing end of the damping unit. Vibrations along the axis of the damper towards the machine can then be effectively damped.

In another implementation, a damping unit for a multi-axis machining center is arranged in use to be coupled to a spindle of the machining center and including an outer housing enclosing a damping mass, the damping mass being movable within and with respect to the housing.

In yet another implementation, a multi-axis milling machine includes a spindle, the spindle arranged to receive a tool holder and in use to cause rotation of the tool holder within the spindle, wherein the spindle includes a housing incorporating at least one pair of opposing damping units.

In a further implementation, a machining center includes a spindle, the spindle arranged to receive a tool holder and in use to cause rotation of the tool holder within the spindle, wherein a portion of the spindle housing surrounding the tool holder is provided with at least one damping unit, the damping unit including a damping mass positioned within a housing and spaced therefrom by a plurality of elastomeric portions, each elastomeric portion being in contact with the damping mass on a first side and with the housing on an opposing side.

In such an arrangement, portions of the housing and or damping mass may be provided with one or more recesses arranged along a line of contact between the elastomeric portion and the damping mass/housing so as to prevent contact between the elastomeric portion and the damping mass/housing across the one or more recesses.

The recesses may be formed on end faces of the damping mass and or opposing inner surfaces of the damping housing. Thus, the increased pressure effect of providing the recesses is only active in the direction of the damper in alignment with or parallel to the direction along which damping is primarily desired.

In another implementation, a method of damping a milling machine includes the steps of: (A) identifying one or more positions and directions of resonant vibration at a frequency approximately equal to a cutting frequency for a machining operation; and (B) positioning a damper as described herein to the milling machine at the identified position and direction.

BRIEF SUMMARY OF THE DRAWINGS

Aspects of the disclosure will now be described, by way of example only, with reference to the accompanying figures in which.

Figure 1:
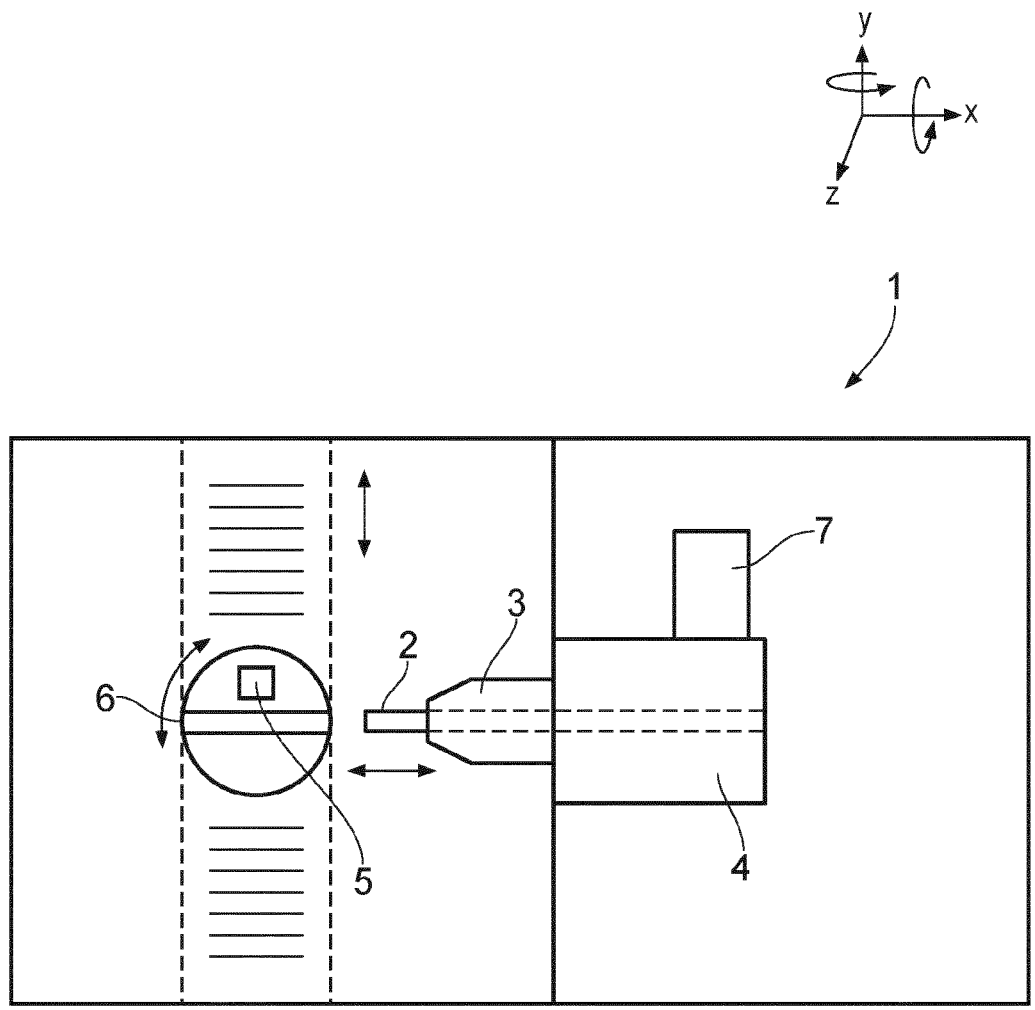
FIG. 1 shows an example schematic of the main components of a computer numerically controlled (CNC) milling station or machine.

While the inventive concepts are susceptible to various modifications and alternative forms, specific implementations are shown by way of example in the drawings and are herein described in detail. It should be understood however that drawings and detailed description attached hereto are not intended to limit the inventive concepts to the particular form disclosed, but rather the disclosure is to cover all modifications, equivalents and alternatives falling within the scope of the claimed invention It will be recognised that the features of the aspects of the implementations described herein can conveniently and interchangeably be used in any suitable combination. It will also be recognised that the disclosure covers not only individual implementations but also combinations of the implementations that have been discussed herein.

DETAILED DESCRIPTION

FIG. 1 is a schematic of a typical multi-axis machining center 1. The example shown is a milling machine including a cutting tool 2 coupled to a spindle 3. The spindle 3 incorporates a tool holder which holds the cutting tool at one end and provides a connection for coupling the tool holder and cutting tool to the spindle 3.

The spindle is coupled to a spindle drive arrangement 4 which is arranged to rotate the spindle (and thus the tool) at high speed. The drive arrangement 4 is also arranged so that it can move the spindle and tool in an axial direction along the x axis shown to the right of FIG. 1.

At the opposing end of the machining center (to the drive arrangement) is the chamber that houses the component to be machined (the workpiece) 5 which is secured to a movable table 6. The table 6 is movable in multiple places (vertically and rotationally). In combination with the axial movement of the cutting spindle the cutting tool can be moved relative to the workpiece in each of the axes shown to the right of FIG. 1.

The machining center includes a large number of sensors which accurately detect the position of the table 6 and cutting tool so that in operation accurate machining can be performed.

The table 6, spindle 3, and drive arrangement 4 each have a large mass to prevent excessive vibrations during a machining operation. Increasing the mass and rigidity of each of the components of the machining center reduces vibrations during machining, allowing for accurate machining. A vibration alarm 7 is however provided which deactivates the cutting (milling) operation if vibration levels exceed a predetermined threshold. In this scenario a vibration or 'excessive movement' alarm is used which detects machine vibration and compares it to a predetermined threshold or level. Vibrations may increase beyond a predetermined level for a number of reasons such as increased tool wear, an increased hardness in a portion of the workpiece or unfavourable cutting characteristics/conditions.

Figure 2:
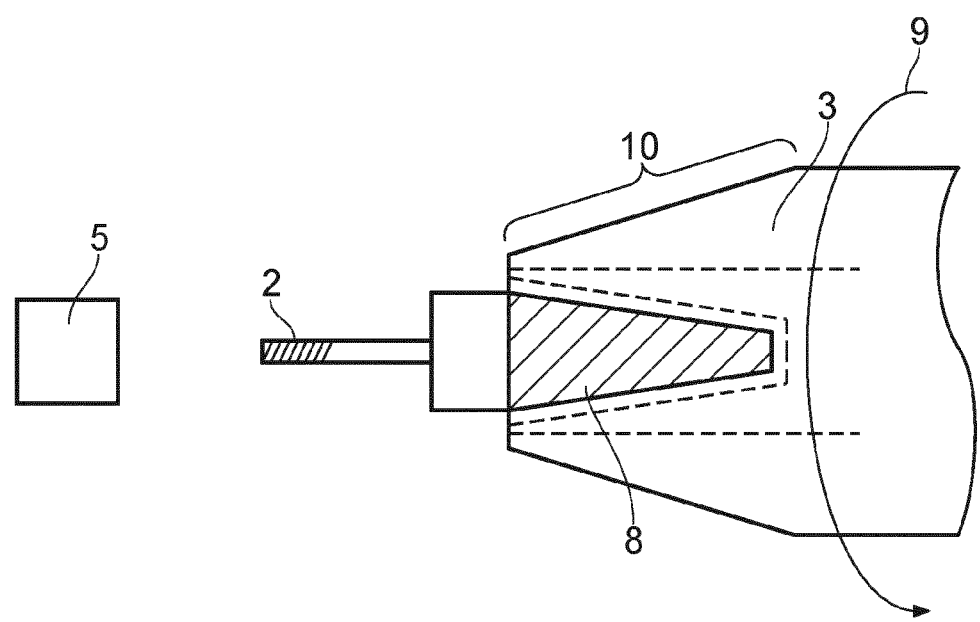
FIG. 2 shows an example spindle of such a milling machine.

FIG. 2 shows a simple cross-section through the spindle 3, cutting tool 2, and workpiece 5. The cutting tool 2 is connected to the spindle 3 by means of a tapered tool holder 8 which allows cutting tools to be conveniently changed within the spindle 3. During operation of the machine, the spindle 3, tool holder 8, and tool 2 are caused to rotate at speed of in excess of 12,000 revolutions per minute, as shown by the arrow 9.

To allow for intricate shapes and geometries to be machined, the end of the spindle 3 closest to the cutting tool 2 (and thus workpiece 5) may on some machines be tapered such that the tool can cut at angles with respect to the workpiece, without the spindle or tool holder connecting with or colliding with the workpiece. In other machines, no taper may be provided on the spindle. It will be appreciated that the disclosure described herein applies equally to a machine with and without a tapered head.

Each machine tool has a number of natural frequencies. The person skilled in the art will understand that, in the context of this disclosure, a natural frequency is a frequency at which parts of the milling machine will vibrate in the absence of any force either exciting a vibration or acting to damp a vibration, i.e., it is the frequency at which the part naturally vibrates.

When a machine is caused to vibrate at or close to the natural frequency, resonance may occur which can cause vibration alarms to be triggered.

The way a machine vibrates during use is a function of two stiffness considerations, namely:
  (i) Static stiffness; and
  (ii) Dynamic stiffness.

During the operation of a machine, a damping arrangement described herein can advantageously influence the dynamic stiffness. Specifically, adding damping increases the dynamic stiffness of the machine (and/or subcomponents of the machine) when the damping is applied in a specific way as described herein.

All machine tools have a number of natural frequencies in their basic construction. Some of these natural frequencies can be disruptive and lead to excessive vibrations during a machining operation. The natural frequencies originate from each part or element in the machine tool. The different vibrations interact (both constructively and destructively) resulting in an overall vibrational performance of a machine being complex and specific to the given machine and, importantly, operating or cutting speeds and conditions. Different cutting speeds, for example, result in different harmonics of vibration being exhibited by the machine.

In one example, there is a need to improve the dynamic stability of a machine at a given cutting speed in revolutions per minute (rpm). For example, for a ceramic cutting tip this may be a cutting speed of 12,000 rpm and a frequency of 200 Hz.

By performing vibrational analysis of each part of the machine using accelerometers and an impact hammer, it is possible to establish how each part of a machine vibrates, and specifically the natural frequencies of each part.

Example equipment that can be used to measure the vibrational characteristics of the machine is as follows:
  Accelerometers—Kistler model 8776A50
  Impulse Hammer—Kistler model 9726A5000

The outputs from the accelerometer and impulse hammer may be communicated to a conventional computer through a input/output interface of the type manufactured by National Instruments. Analysis of the data can then be formed using commercially available software such as CUT-PRO. The vibrational characteristics, i.e., the force/vibration characteristics of each part of the machine, can be mapped my moving the accelerometer and/or using multiple accelerometers to determine where vibrations occur and their associated natural frequencies. The damper can then be positioned according to this determination in combination with the expected operating speed of the machine.

Specifically, a model can be built and the location and direction of the part of the component with the natural frequency which is most closely matched to the cutting frequency can be identified. This is termed herein as the 'weakest' part of the machine, i.e., the part of the machine that needs to be damped to prevent resonance at the given cutting speed and frequency (12,000 rpm and 200 Hz in one example).

The vibration analysis can be conducted using conventional accelerometers and impact hammer(s). The accelerometers are distributed around the machine and a predetermined impact is applied to the machine to cause the machine to vibrate. The accelerometer outputs can then be recorded and the location of the machine sub-component with a natural frequency closest to the cutting frequency (that is the rpm speed divided by 60) can be identified. Similarly, the accelerometers can be used to determine the direction in which this part of the machine vibrates.

Thus, using accelerometers and an impact hammer, it is possible to locate the part or parts of the machine which will vibrate close to the cutting frequency. This part is therefore the part that is likely to resonate during the cutting process because the cutting frequency will cause resonance which in turn will cause that part of the machine to vibrate at increasing amplitude. This, in turn, can cause the vibration alarm of the machine to be triggered.

In one example embodiment, a machine has a weakest dynamic stability at 200 Hz in an X direction of the machine. The vibration analysis described above established that the natural frequency of 200 Hz can be found at the machine's spindle housing in an X direction.

Once the location and direction of the 'weakest' natural frequency is found, it then defines the position and direction at which a multi-tuned mass damper (MTMD) should be located. In one example, this is the top of the spindle housing.

Figure 3:
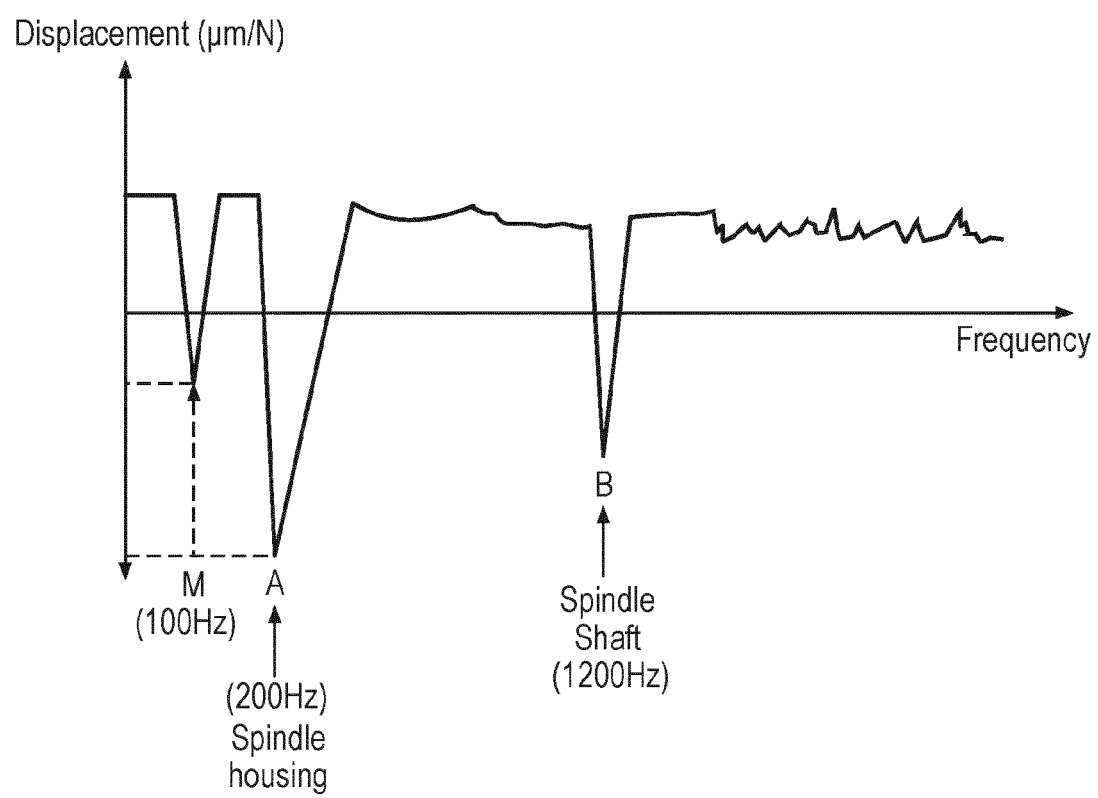
FIG. 3 is an example schematic graph showing natural frequencies for an example spindle housing.

FIG. 3 shows a graph illustrating frequency versus displacement and the associated natural frequencies for an example spindle housing As shown in FIG. 3, the displacement in the y axis is caused by the vibration of the machine. Three separate frequencies are illustrated by FIG. 3.

The first is frequency M at approximately 100 Hz which reflects the resonance of the machine tool foundations, i.e., the base structure of the machine.

The second frequency A is at 200 Hz and represents the resonance of the spindle housing.

The third frequency B is at 1200 Hz and represents the spindle shaft frequency.

Figure 4A:
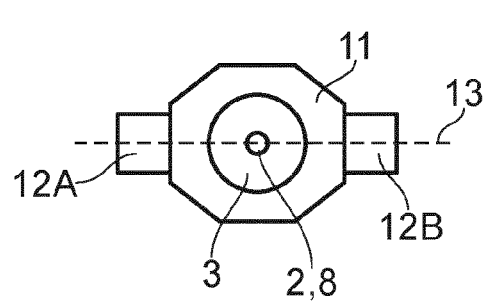
FIGS. 4A and 4B show an example spindle including a pair of damping units.
Figure 4B:
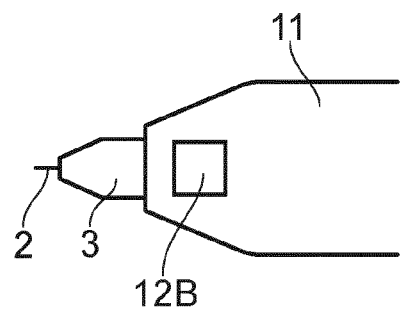

FIG. 4A shows an end view of the spindle 3 holding the tool holder 8 and cutting tool 2 along its central axis. The surrounding housing 11 which supports the spindle is also shown. In FIG. 4B, a side view of the housing 11 is shown illustrating the optionally tapering of the housing.

Returning to FIG. 4A, the modified housing arrangement according to the present disclosure is shown. Specifically, a pair of opposing damping units 12A and 12B are shown. However, a pair of opposing dampers may not be required; a single damper may provide sufficient damping to achieve the desired results for a given machine.

The damping units 12A and 12B are mounted onto the sides of the spindle housing 11 and, in the example shown, are arranged to align with an axis 13 (that passes through the center of the spindle and cutting tool). The precise axis may vary depending on the machine and the results of the vibration analysis and may not always pass through the center of the spindle shaft. The damping units 12A and 12B are firmly connected to the spindle housing, for example, using a nut and bolt arrangement. They may advantageously be integrally formed into the spindle housing to form a single housing component incorporating the pair of opposing damping units or zones. They may also be retrofitted to the outer surface of existing housings.

The damping units 12A and 12B act to interact with the vibration of the spindle housing which passes through the spindle shaft. In effect, the damping units provide a multi-tuned mass damper for a machining center which allows for the control of machining vibrations.

The damping units 12A, 12B will now be described in further detail with reference to FIGS. 5A, 5B, 6, 7A, and 7B.

Figure 5B:
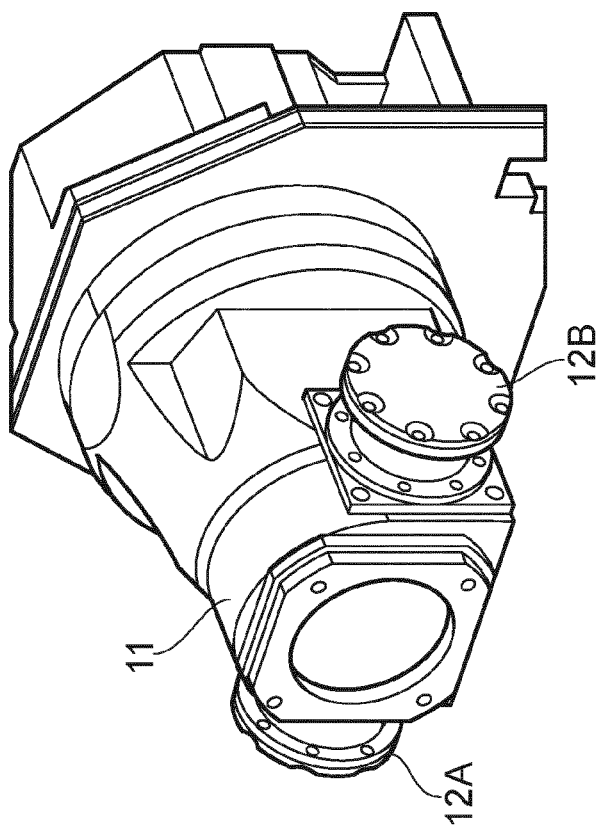
FIGS. 5A and 5B show an example spindle with and without a pair of damping units.
Figure 5A:
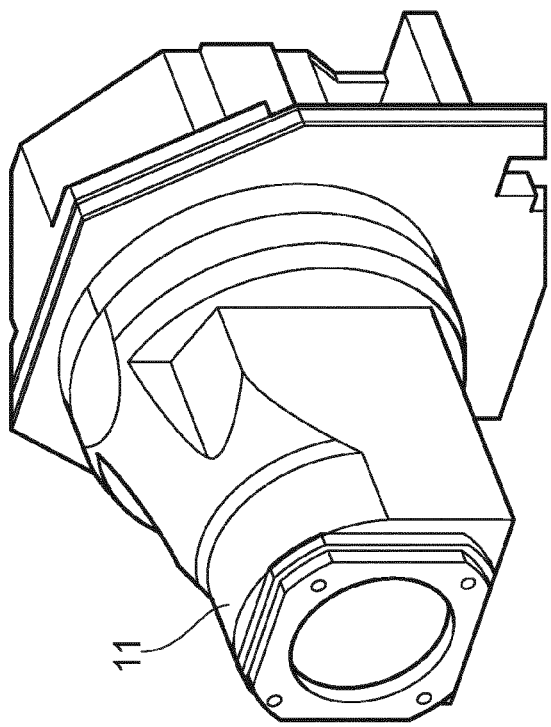

FIGS. 5A and 5B show an example spindle housing with and without the pair of damping units 12A and 12B, respectively. As shown in FIG. 5B, the pair of damping units are coupled directly to the sides of the spindle housing 11 by means of a bolt arrangement. Such an arrangement can be conveniently retro-fitted to the spindle housing.

Figure 6:
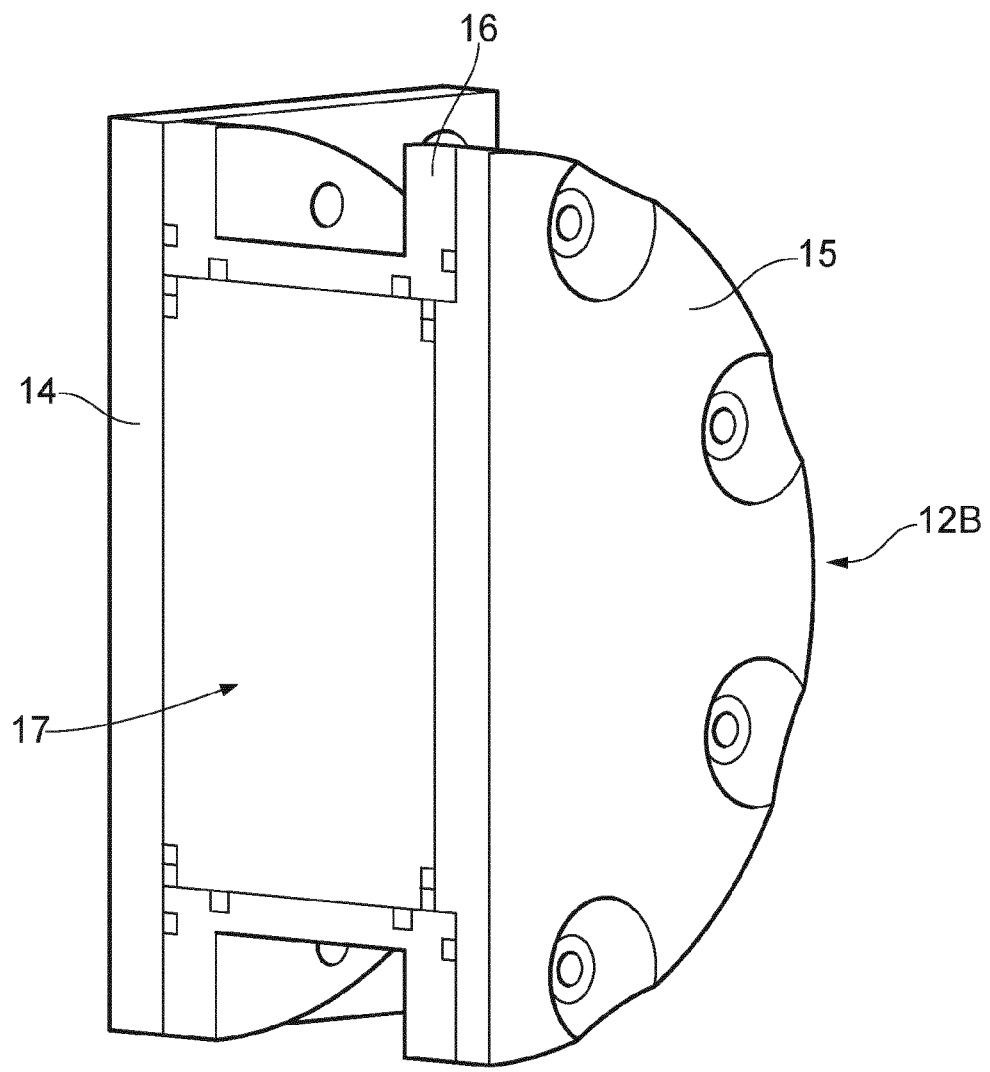
FIG. 6 shows a cross-section through one damping unit.

FIG. 6 shows a cross-section through the damping unit 12B shown in FIG. 5B.

The outer housing of the damping unit 12B is formed of 3 parts defining a central cavity or space to receive a damping mass. The first part 14 is arranged for abutment with the spindle housing 11 as shown in FIG. 5B. The second part of the housing is opposing face 15. A cylindrical body 16 extends between the two faces and can be coupled to each one by means of a flange extending around the perimeter of the cylindrical portion 16. The flange can be conveniently bolted on both sides of the central body 16 to define the cavity within the housing and to rigidly connect the housing to the spindle housing. The same arrangement is optionally replicated on the opposing side of the spindle housing for damping unit 12A.

The outer housing of the damping unit defines an inner cavity or chamber 17 which is described with reference to FIGS. 7A and 7B.

The chamber contains a damping mass 18 which is contained within and enclosed by the outer casing. The damping mass is also spaced from the inner surface of the outer case via a plurality of elastic/elastomeric members 19. The elastic members shown are in the form of elastomeric O-ring seals that extend around perimeter of the damping mass. Other types of elastic spacers may also be used and may not be in the form of a continuous profile, but may be a number of discrete elastomeric portions providing the same spacing effect as an O-ring seal.

Figures 7A, 7B:
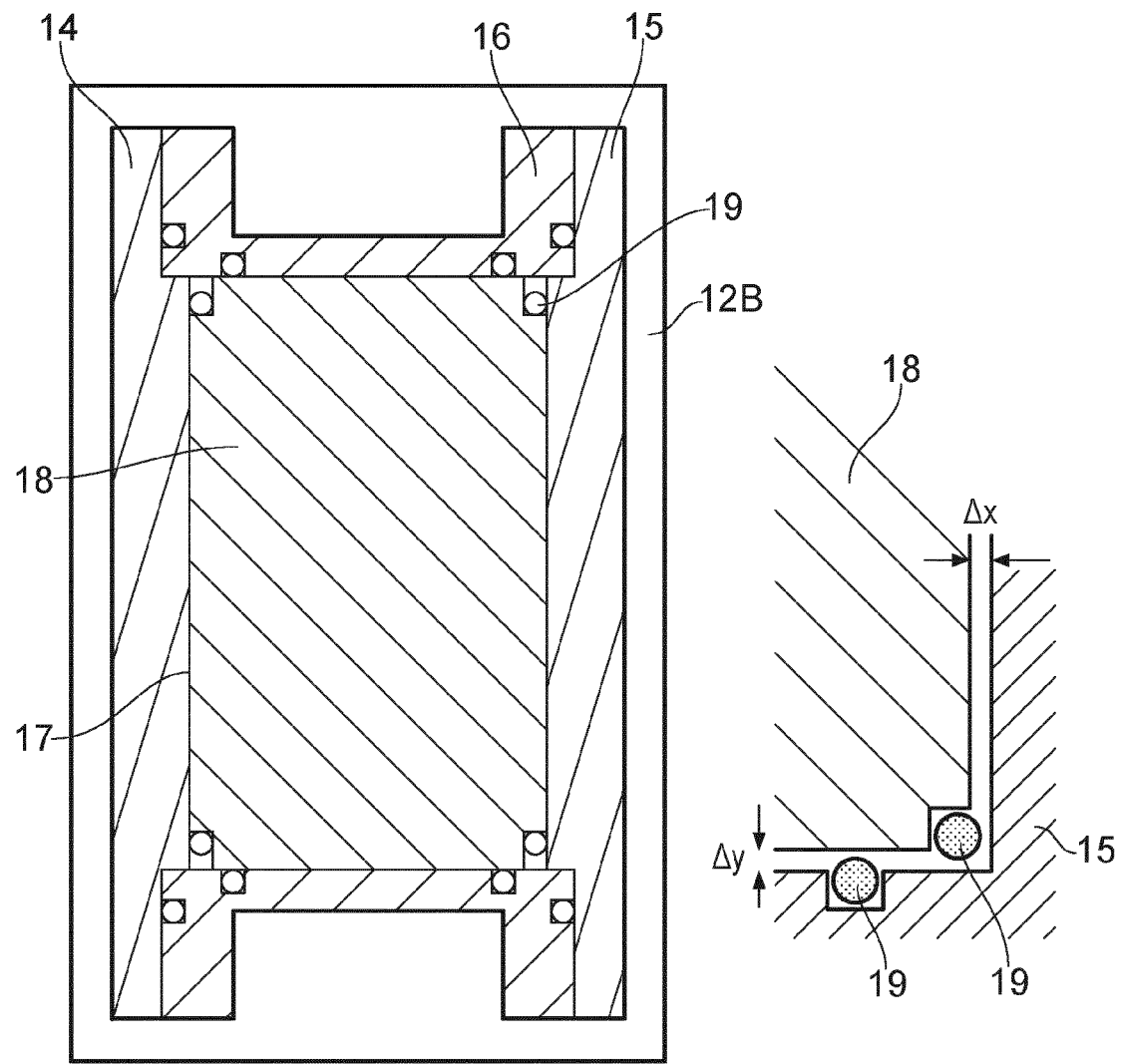
FIGS. 7A and 7B show a cross-section through a damping unit and the positioning of elastomeric seals (such as O-ring seals or similar flexible/elastomeric seals)

As shown in FIGS. 7A and 7B a first pair of O-ring seals are arranged on the end faces of the cylindrical damping mass and a second pair are arranged on the outer peripheral surfaces of the damping mass. As shown in FIG. 7B, two clearances $\Delta x$ and $\Delta y$ are thereby provided to space the damping mass from the outer casing.

During operation of the machining apparatus, the vibration of the spindle housing causes vibration of the outer casing of the damping unit. This in turn causes vibration of the damping mass through the elastomeric O-ring connections and this creates a damping effect because of the latency of movement of the damping mass with respect to the damping unit as the elastomeric couplings compress and expand out of synchronisation with the excitation frequency.

The precise level of damping can be optimised by adjusting the clearances $\Delta x$ and $\Delta y$ and the size and material (hardness or elasticity) of the O ring material (and also the specific mass of the damping mass itself).

In one example, the damping units are configured to provide a desired dynamic stability and damping rate for a given machine design and for the anticipated machining speeds. This defines the frequency of damping needed.

For example, for a milling machine as manufactured by GROB (as discussed above), the parameters determined include:

Damping mass: Densimet 19.0 kg/dm$^3$, damping mass=4.7 kg each (2 dampers).

Material Elasticity: O-ring 70×3 Nitril
O-ring 80×3 Nitril

A damping unit with these characteristics is then located on the machine at a position corresponding to the position of weakest dynamic stability (as described above). This acts to increase the dynamic stability of the spindle housing (this having been identified by the frequency analysis). The effect of improving the dynamic stability is that machine vibration is dramatically reduced at the desired cutting speed for super alloy materials. This, in turn, prevents vibration levels exceeding those of the manufacturer defined limits and thereby prevents an automatic shut-down of the machine (a vibration alarm trigger). Furthermore, the accuracy of machining can also be increased through a reduction in vibration and thus displacement of the cutting tool with respect to the workpiece.

Figure 8A:
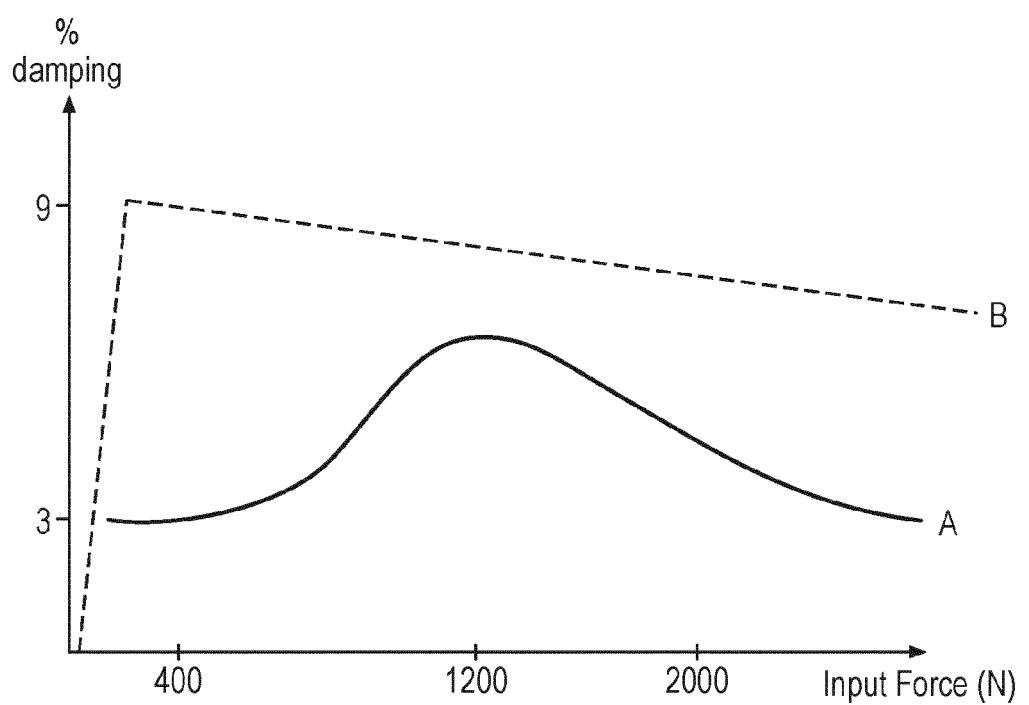
FIGS. 8A, 8B and 8C show a further improved arrangement of a damper described herein.
Figure 8B:
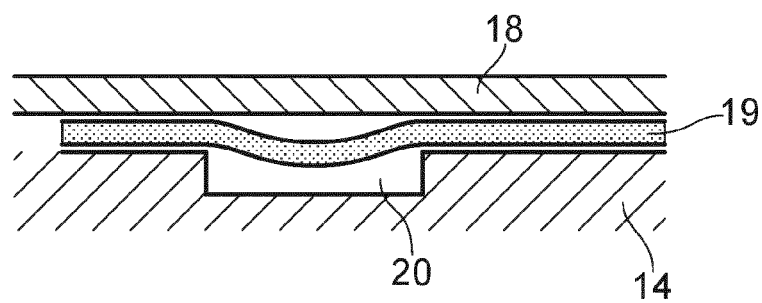
Figure 8C:
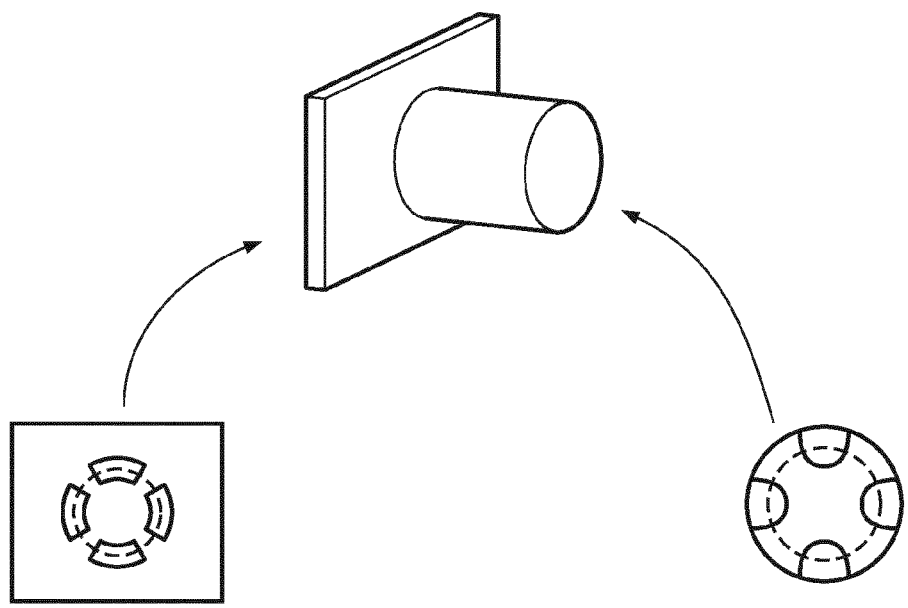

The performance of the damping units described herein can be further optimised beyond the advantages described above. FIGS. 8A, 8B, and 8C illustrate such a further improvement.

Specifically, the present disclosure establishes that creating a discontinuous or interrupted elastomeric coupling between the damping mass and the damper housing provides a surprising improvement in dynamic performance of the damper.

In the examples described above, a continuous elastomeric O-ring seal is used in the damping arrangement. Thus, there is a continuous contact line between:
(i) the O-ring and the damper mass (in the cavity of the damper); and
(ii) the O-ring and the housing of the damper (around the periphery of the damper mass)

In effect, the O-ring is sandwiched between the damper mass and the damper housing. Compression and expansion of the elastomer allows for the damping described herein.

FIG. 8A illustrates the damping performance of the modified damper with damping percentage on the y axis and input cutting force on the x axis.

Line A in FIG. 8A shows damping performance of the first embodiment of a damper as described above, i.e., a damper with a continuous elastomeric coupling between damping mass and damper housing. As shown, damping percentage increases slowly with input force and peaks at around 1200 Newtons before tailing off as input force increases and damping effect reduces.

Line B illustrates a modified damper performance incorporating a discontinuous coupling of elastomer to damping mass and housing. As illustrated by line B, the percentage of damping increases dramatically faster than the conventional arrangement. As shown, the damping percentage increases at very low input forces providing damping at low machining loads. Also, the damping percentage remains higher than the conventional arrangement for all input loads.

In operational terms, this means that a modified damper can provide effective damping at both low machining loads associated with finishing machining and also high machining loads associated with roughing machining. This broad range of damper performance as provided by the damper arrangement described herein is highly advantageous in machine tools.

FIGS. 8B and 8C show one arrangement to achieve these performance improvements. In the example shown, a series of recesses are formed in the damper housing and/or damper mass in line with the contact line of the O-ring seal. A recess 20 is formed so as to de-couple or disconnect the O-ring 19 from compression contact with the damper mass 18 and end plate 14. In effect, the recess 20 disconnects the O-ring seal from connecting between the mass and the housing of the damper. This effectively reduces the contact area of the O-ring seal between the damper mass and housing at either end of the damper. Reducing the contact area increases the pressure on the remaining portions of the O-ring which are in contact with the damper mass on one side and the housing on the other.

The present disclosure establishes that reducing the contact area of the elastomer seals using the recess leads to the performance change shown in FIG. 8A, i.e., further improved dynamic damping performance.

The specific performance of the damper can be selected depending on the characteristics of the machine and the desired damping performance. For example, the contact area may be modified in combination with the elastomer hardness to achieve the desired performance. In one example, a shore hardness of between 70 and 90 shore A may be used.

FIG. 8C shows examples of how the recesses may be incorporated into the end housings of the damper.

At the left-hand side of FIG. 8C, the damper connection to the machine is shown and incorporates a plurality (4 in this example) of slots. The dotted line indicates the normal contact line of the O-ring. As shown in FIG. 8B, the way the recesses overlap this contact line creates a space which results in the de-coupling of the compression contact between the O-ring and the damping mass.

At the right-hand side of FIG. 8C, the damper connection to the end housing of the damper is shown. Here, for simplicity of manufacture, 4 semicircles have been machined into the end portion of the housing. Again, the dotted line shows the contact line of the O-ring which overlaps with the 4 semicircles.

It will be recognised that the de-coupling of the contact line of the elastomer can be achieved in a variety of ways and is not limited to the two examples shown. For example, the O-ring itself could be modified to have a reduced thickness or to include recesses or cut-away portions creating the same effect. Similarly, instead of a single continuous O-ring or elastomeric member, a plurality of discrete elastomeric portions may be provided.

Figure 9A:
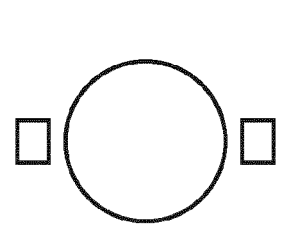
FIGS. 9A, 9B and 9C show alternatively configurations of damping units with respect to a spindle housing.
Figure 9B:
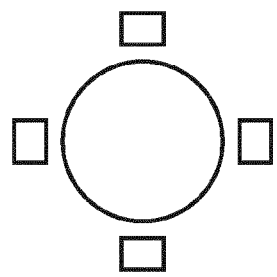
Figure 9C:
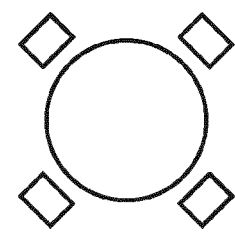

FIGS. 9A-9C illustrate alternative arrangements of damping units with respect to the spindle. The dampers may be single dampers or dampers arranged in pairs or groups. In each case, the damping effect is arranged to improve the dynamic stability of the machine at the point (and in a direction) where a resonance will occur during the anticipated cutting parameters.

As shown in FIGS. 9A, 9B, and 9C, the dampers may be arranged at a variety of positions around the spindle housing.

It will be recognised that the damping arrangement and approach described herein may be situated at any position of a machine according to the natural frequency measurements and the desired cutting speed/frequency. For particular 5 axis milling machines, it has been determined that the optimal position may, as described above, be on the spindle housing itself.

The invention claimed is:

1. A multi-axis milling machine, comprising:
a spindle having a spindle housing; and
a damper,
wherein the spindle is configured to receive a tool holder and to cause rotation of the tool holder within the spindle,
wherein a portion of the spindle housing surrounding the tool holder is provided with the damper,
wherein the damper comprises an outer housing enclosing a damping mass, the damping mass being movable within and with respect to the outer housing and spaced from the outer housing by a plurality of elastomeric or rubber elements, and wherein the elastomeric or rubber elements are continuous and portions of an inner surface of end faces of the outer housing and/or portions of end faces of the damping mass are provided with recesses in alignment with a line of contact of the elastomeric elements and the end faces.

2. The machine of claim 1, wherein the damper is coupled to the spindle housing at a position corresponding to a location of a resonant frequency of the spindle housing at a predetermined spindle operating speed.

3. The machine of claim 1, wherein the damping mass and outer housing are in the form of a concentric cylinder and a surrounding housing, and wherein the concentric axis of the cylinder and surrounding housing is arranged to be parallel with an axis along which the spindle housing vibrates at resonance.

4. The machine of claim 1, wherein the elastomeric or rubber elements are in the form of O-ring seals positioned proximate to a perimeter of the damping mass.

5. The machine of claim 1, wherein the damper is included in one or more pairs of dampers circumferentially spaced around the spindle.

6. The machine of claim 1, wherein the spindle housing is provided with a pair of opposing dampers.

7. A damping unit, comprising:
a damper configured to be coupled to a spindle of a multi-axis machining center or milling machine, the damper further including:
a damping mass; and
an outer housing enclosing the damping mass,
wherein the damping mass is movable within and with respect to the outer housing,
wherein the damping mass is spaced from the outer housing by a plurality of elastomeric or rubber elements, and
wherein the elastomeric or rubber elements are continuous and portions of an inner surface of end faces of the outer housing and/or portions of end faces of the damping mass are provided with recesses in alignment with a line of contact of the elastomeric elements and the end faces.

8. A method of damping a milling machine, comprising:
identifying, on the milling machine, one or more positions and directions of resonant vibration at a frequency approximately equal to a cutting frequency for a machining operation; and
positioning a damping unit of claim 7 on the milling machine at the identified position and direction.

9. A machining center, comprising:
a spindle having a spindle housing, the spindle configured to receive a tool holder and to cause rotation of the tool holder within the spindle; and
a damper having a damping mass that is disposed within a damper housing and spaced therefrom by a plurality of elastomeric portions,
wherein the damper is provided on a portion of the spindle housing surrounding the tool holder, and
wherein each elastomeric portion is in contact with the damping mass on a first side and with the damper housing on an opposing side, and
wherein portions of the damper housing and/or damping mass are provided with one or more recesses arranged along a line of contact between each elastomeric portion and the damping mass/damper housing so as to prevent contact between each elastomeric portion and the damping mass/damper housing across the one or more recesses.

10. The machining center of claim 9, wherein the recesses are disposed on end faces of the damping mass and/or opposing inner surface of the damper housing.

* * * * *